Figure 1:
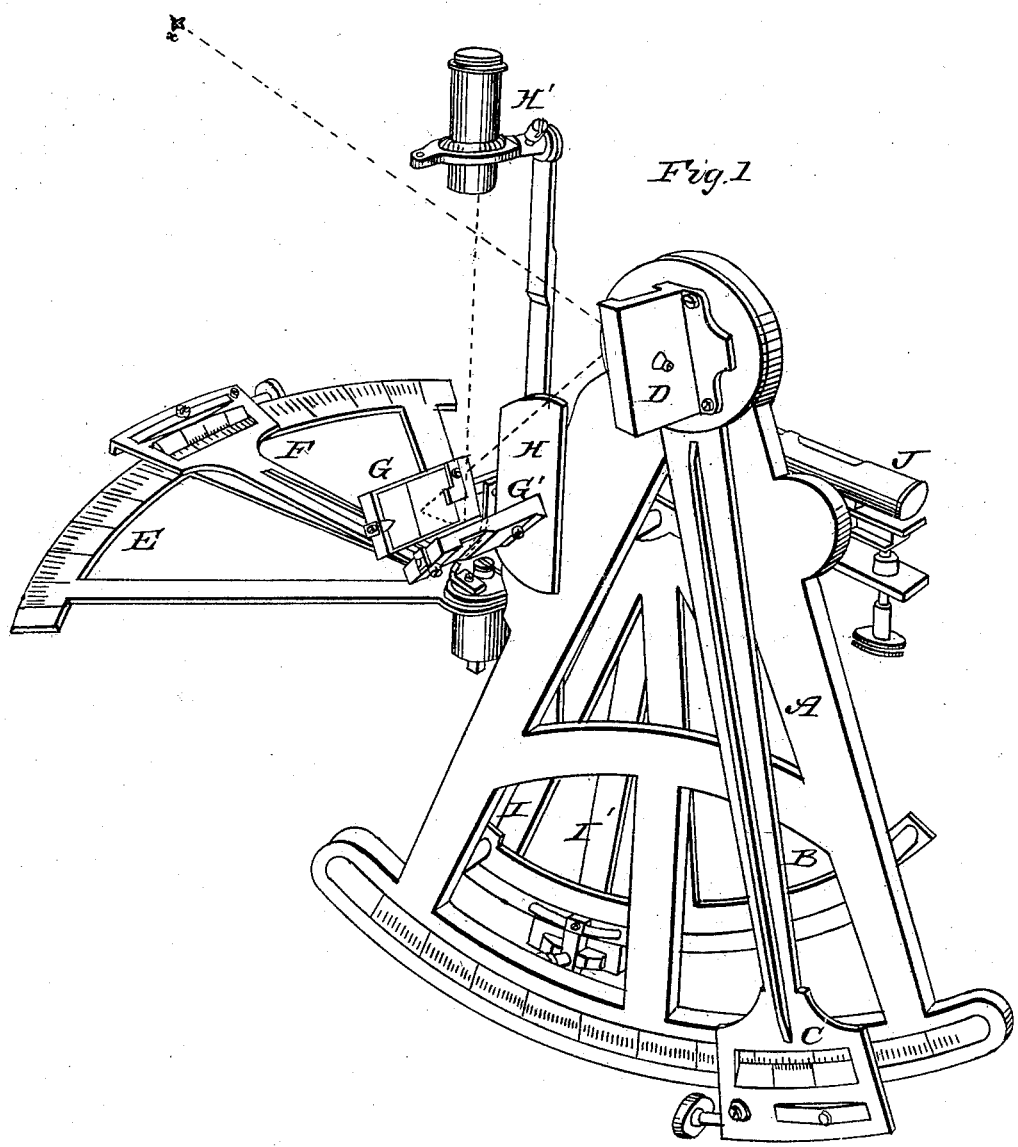

H. GLOVER.

Sextant.

No. 22,075.

2 Sheets—Sheet 1.

Patented Nov. 16, 1858.

H. GLOVER.
Sextant.
No. 22,075.
2 Sheets—Sheet 2.
Patented Nov. 16, 1858.
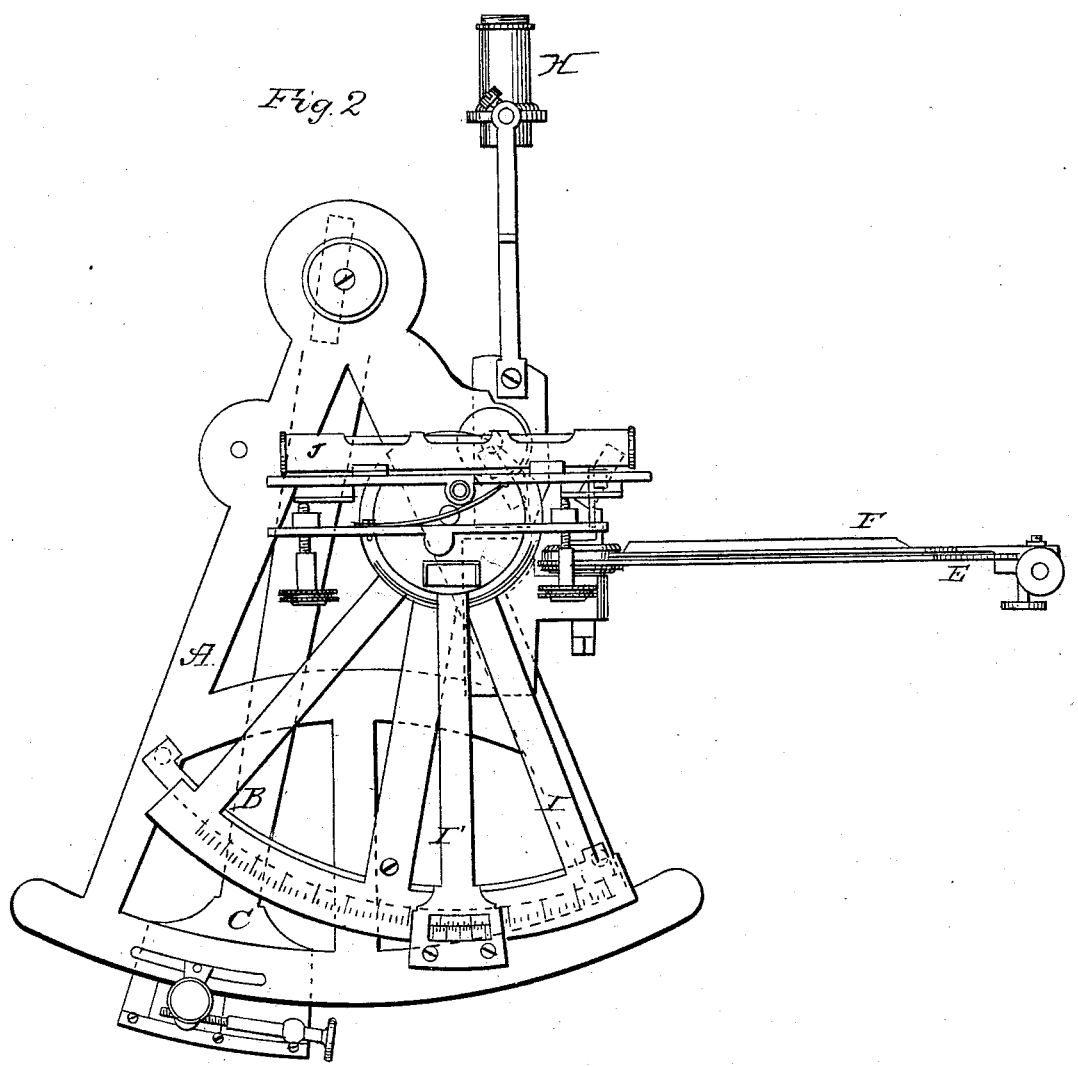

UNITED STATES PATENT OFFICE.

HENRY GLOVER, OF NEW YORK, N. Y.

ASTRONOMICAL INSTRUMENT.

Specification of Letters Patent No. 22,075, dated November 16, 1858.

*To all whom it may concern:*

Be it known that I, HENRY GLOVER, of New York, county of New York, and State of New York, have invented certain new and useful Improvements in Apparatus for Taking Altitudes, &c.; and I do hereby declare that the following is a full, clear, and exact description of the same, reference being made to the annexed drawing, making a part of this specification, in which—

Figure I is a perspective view of a sextant with my improvements attached; Fig. II is an elevation of the reverse side; and similar letters indicate similar parts throughout the figures.

My invention has for its purpose, measuring the angular distance of one or more objects from each other, and is an improvement on that class of reflecting instruments of the sextant and quadrant kind.

By means of my said improvement I am enabled to measure at one and the same time, if occasion requires it, not only the angular distance of two celestial or other similarly situated objects, but their altitude above the horizon also. I can likewise obtain the zenith distance of an object without a sea or artificial horizon. The instrument when arranged for measuring the angular distance of two objects, together with their altitude, consists of two graduated arcs combined in such manner that the plane of one arc shall be at right angles to that of the other. Each arc has a limb attached with nonius as usual in sextants, and said limb has also reflectors placed on the end through which the axis pin is placed. One of these arcs measures the altitude and the other the angular distance between two contiguous objects that are at the same altitude. The arc measuring the distance apart lies horizontally, and that which measures altitude is vertical when held in position for conducting observations. The two will be called therefore the horizontal and the vertical arcs in the description, although in taking some observations these positions will not be rigorously observed.

The vertical arc is seen at A in Figs. I and II, and, as there represented, is substantially a sextant-frame having its limb B with nonius C and mirror D, as usual. The horizontal arc is seen at E attached to the front leg of the frame of A at that part where the horizon—glass is usually placed in the ordinary sextant. It has a limb F with nonius scale as in the other arc, and as represented. At the axis of this limb is an inclined mirror or reflector G which by being attached to said arm follows it in its movement along the arc E. At this part of the instrument there is also another mirror or reflector G', but this one is so attached to the frame of A as to be capable of movement on an axis pin passing from the end of said mirror into said frame. In connection with this mirror is a post H, at the top of which is the sighting piece or telescope H' through which the reflected object is viewed. The mirrors G and G' are placed so as to stand at an angle to each other, which angle may be varied by moving the arm H, the mirror G however always being placed so as to be parallel with D, when the limb to which the latter is attached is upon zero of the graduated arc. This causes them to have the general position of the letter V when the upper and lower edges of their frames are parallel. As however the mirror G moves with its limb F this parallelism is only maintained when the said limb is at the center of its arc E. The other angle is constant, however the limb F may be moved. It is this feature, viz. that by which the angle of glasses laterally may be changed without alteration of the angle at which the ends incline that the measurement of angular distance of two objects together, with their altitude, may be simultaneously measured.

On the back of arc A there is a second arc I, of smaller dimensions, secured to the first at a short distance from it, but so that the two will be parallel. The front leg of the frame is also to be in line with that of A, as seen in the back view Fig. II. The limb I' to this arc carries a cross-level at its head, as at J, which is fixed upon a center, and having its ends supported by adjusting screws as shown. The limb I' is to be at the zero of its arc when the limb B is also at zero upon the other arc, and the bubble of the level must then be in the middle. It will be seen from the position of the sighting point H', that one eye can be viewing the position of the level while observing the objects to be measured with the other eye.

The method of using is as follows: If it is desired to observe the altitude and at the same time the angular distance apart of two objects as (*x y*) the limb B must be brought to the zero on its arc, then by holding the frame A in a vertical position, and so as to present the instrument toward the object, get a near adjustment by looking down (with the naked eye placed near the sight H') upon the mirror G' until (x) is seen within it. Then view it through the sight or telescope H' and, if need be, moving the arm H to alter the angle of the glass G' to that of G. The limb F being at zero (which is at the middle of its quadrant), the course of the ray from (x) will be first to the mirror D, and thence it will be reflected upon G and from that upon G'; the angle of incidence must there be such as to reflect it vertically to the eye. The limb B having been clamped at zero it will be found that to get this course for the ray from the object (x) the arm or post H has been slightly moved, so that both arm and limb are held at the time of the observation in a perfectly perpendicular position. This will have thrown up the front leg of the frame equal to half the attitude of the object. The observer now keeping the star (if that be the object measured) on the cross bars of his telescope with one eye, and then looking down upon the level with the other, moves the limb F along until the bubble is seen in the middle. The arc may now be read off which will give the altitude. Now to measure the distance of (y) from (x) when they are at nearly the same altitude. Keeping (x) in the field as before, move the limb F until (y) appears in the field; continuing the motion it will approach (x), and when the two coincide the arc F may be read off and will be the angular distance. In case the two stars are at the same exact altitude they will eclipse each other in the telescope, and of course the angular distance in such case will be more exactly ascertained than when the two differ in altitude. To get the difference of altitude proceed as before described for (x) by bringing (y) to the cross wires and adjusting the level anew.

A part of these improvements are also applicable to quadrants whereby they are capable of measuring an object in altitude, either by a sea horizon, as usual, or by zenith distance, in case the horizon is at any time obscure, while the sky is clear above. For this purpose all may be dispensed with except the two mirrors G and G' and the vertical sight. These mirrors are only partly silvered, and hence an eye piece or sight placed as usual upon the arm of the frame horizontally opposite enables an observation to be taken from the horizon as in the common modes as well as in that by a zenith distance. For this latter mode a vertical sight as H' will have to be used in the manner already described for measuring two objects.

I claim—

1. The use of the double reflectors or mirrors G, G' in combination with a vertical sight, whither the said mirrors are fixed or made adjustable substantially as set forth.

2. I claim the second graduated arc E in combination with the main instrument A and with the second mirror G' in the manner and for the purposes set forth.

3. I claim the supplemental arc I in combination with the level J and with the main instrument A in the manner and for the purpose set forth.

In witness whereof I have hereunto subscribed my name.

HENRY GLOVER.

Witnesses:
I. P. PIRSSON,
S. H. MAYNARD.